(12) United States Patent
Kim et al.

(10) Patent No.: US 12,202,078 B2
(45) Date of Patent: Jan. 21, 2025

(54) LASER PROCESSING APPARATUS

(71) Applicant: Samsung Display Co., Ltd., Yongin-si (KR)

(72) Inventors: Kyu-Bum Kim, Yongin-si (KR); Jaeseok Park, Suwon-si (KR); Jungseob Lee, Hwaseong-si (KR); Kyongho Hong, Hwaseong-si (KR); Inho Lee, Hwaseong-si (KR); Bosuck Jeon, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 608 days.

(21) Appl. No.: 17/545,982

(22) Filed: Dec. 8, 2021

(65) Prior Publication Data

US 2022/0241906 A1 Aug. 4, 2022

(30) Foreign Application Priority Data

Feb. 3, 2021 (KR) .......................... 10-2021-0015695

(51) Int. Cl.
*B23K 37/04* (2006.01)
*B23K 26/02* (2014.01)
*B23K 26/362* (2014.01)

(52) U.S. Cl.
CPC .......... *B23K 37/0408* (2013.01); *B23K 26/02* (2013.01); *B23K 26/362* (2013.01)

(58) Field of Classification Search
CPC .......... B23K 2101/36; B23K 2103/172; B23K 26/02; B23K 26/1224; B23K 26/127; B23K 26/362; B23K 26/402; B23K 37/0408
USPC ..................................................... 219/121.68
See application file for complete search history.

(56) References Cited

U.S. PATENT DOCUMENTS

| | | | |
|---|---|---|---|
| 6,307,620 B1 * | 10/2001 | Takabayashi | G03F 7/70916 355/72 |
| 9,234,270 B2 * | 1/2016 | Choi | C23C 14/243 |
| 10,410,901 B2 | 9/2019 | Furuta et al. | |
| 2003/0102016 A1 * | 6/2003 | Bouchard | H01L 21/67721 134/32 |
| 2018/0053673 A1 | 2/2018 | Lee et al. | |

(Continued)

FOREIGN PATENT DOCUMENTS

| KR | 10-0641004 | 11/2006 |
|---|---|---|
| KR | 10-1516333 | 5/2015 |

(Continued)

*Primary Examiner* — Dana Ross
*Assistant Examiner* — Joseph W Iskra
(74) *Attorney, Agent, or Firm* — KILE PARK REED & HOUTTEMAN PLLC

(57) ABSTRACT

A laser processing apparatus includes a stage configured to transfer a target substrate and including an opening, an electrostatic chuck disposed on the stage and including a plurality of holes, and a laser irradiation unit disposed above the stage and spaced apart from the stage and configured to irradiate a laser beam on the target substrate. A surface of the electrostatic chuck is in contact with the target substrate, the target substrate includes a plurality of etching regions to be etched by the laser beam and a non-etching region surrounding the plurality of etching regions of the target substrate, and the plurality of holes of the electrostatic chuck overlap the opening of the stage and the plurality of etching regions of the target substrate.

20 Claims, 14 Drawing Sheets

(56) References Cited

U.S. PATENT DOCUMENTS

2018/0247853 A1* 8/2018 Furuta .................. B23K 26/009
2019/0217427 A1* 7/2019 Hong .................... B25B 11/005

FOREIGN PATENT DOCUMENTS

| KR | 10-1671390 | 11/2016 |
| KR | 10-1789582 | 10/2017 |
| KR | 10-2018-0099481 | 9/2018 |
| KR | 10-1923174 | 11/2018 |
| KR | 10-1906288 | 12/2018 |

* cited by examiner

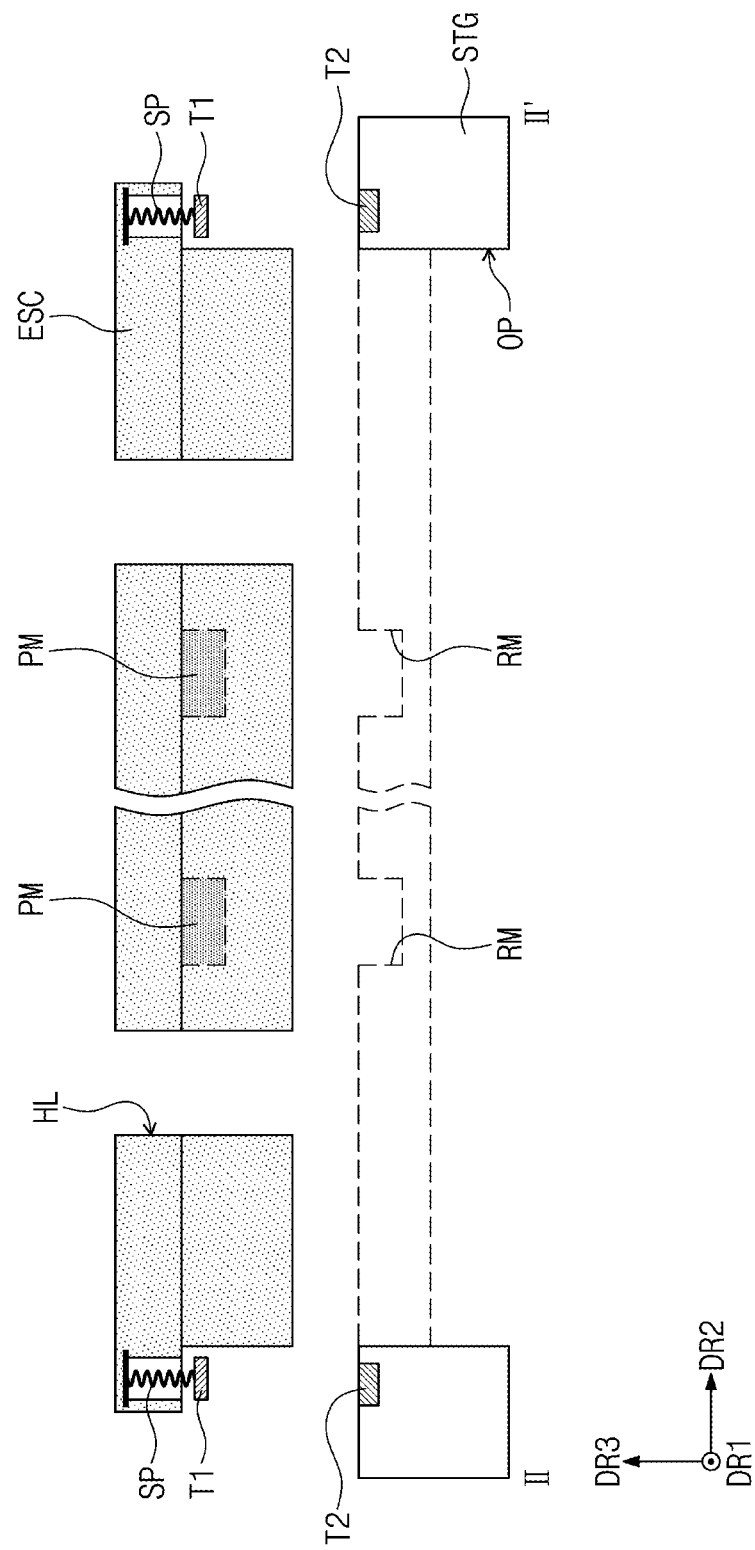

LASER PROCESSING APPARATUS

CROSS-REFERENCE TO RELATED APPLICATIONS

This application claims priority from and the benefit of Korean Patent Application No. 10-2021-0015695, filed on Feb. 3, 2021, which is hereby incorporated by reference for all purposes as if fully set forth herein.

BACKGROUND

Field

Embodiments of the invention relate generally to a laser processing apparatus, and more particularly, to a bottom-up type laser processing apparatus.

Discussion of the Background

A display device may be composed of various electronic components such as a display module for displaying an image, an input sensing module for sensing an external input, and an electronic module. The display module may include a light-emitting element for emitting light. The electronic module may include a camera, an infrared sensor, a proximity sensor, and the like.

In recent years, as the designs and functions of display devices have gradually diversified, users have shown a preference for a display device having a wider display region and a narrower bezel region. In order to reduce the area of the bezel region, an electronic module typically disposed in the bezel region may be disposed in an insertion hole formed in the display module.

In order to form the insertion hole in the display module, a laser processing apparatus may be used. Therefore, a laser processing apparatus suitable for mass production of a display device with a reduced bezel area would be desirable.

The above information disclosed in this Background section is only for understanding of the background of the inventive concepts, and, therefore, it may contain information that does not constitute prior art.

SUMMARY

A laser processing apparatus for facilitating mass production of a display device constructed according to the principles of the invention is capable of reducing or shortening process time and improving reliability.

The laser processing apparatus constructed according to the principles of the invention is capable of reducing or shortening the time for replacing an electrostatic chuck thereof when the electrostatic chuck is replaced, and the electrostatic chuck may be replaced without deteriorating the flatness.

The laser processing apparatus constructed according to the principles of the invention is capable of preventing a loss due to process interruption by minimizing process delay due to power failure.

Additional features of the inventive concepts will be set forth in the description which follows, and in part will be apparent from the description, or may be learned by practice of the inventive concepts.

According to an aspect of the invention, a laser processing apparatus including: a stage configured to transfer a target substrate and including an opening; an electrostatic chuck disposed on the stage and including a plurality of holes; and a laser irradiation unit disposed above the stage and spaced apart from the stage and irradiating a laser beam on the target substrate, wherein a surface of the electrostatic chuck is in contact with the target substrate, the target substrate is divided into a plurality of etching regions to be etched by the laser beam and a non-etching region surrounding the etching regions, and the plurality of holes of the electrostatic chuck overlap the opening of the stage and the etching regions of the target substrate.

Planar areas of the plurality of holes of the electrostatic chuck may be greater than the planar areas of the etching regions of the target substrate overlapping the plurality of holes of the electrostatic chuck.

The planar areas of the plurality of holes of the electrostatic chuck may be substantially the same as each other.

The planar areas of at least two holes among the plurality of holes of the electrostatic chuck may be different from each other.

The plurality of holes of the electrostatic chuck may be disposed to overlap the plurality of etching regions of the target substrate, respectively.

Some of the plurality of holes the electrostatic chuck may be disposed to overlap the plurality of etching regions of the target substrate, respectively.

One of the plurality of holes of the electrostatic chuck may be disposed to overlap some of the plurality of etching regions of the target substrate.

Each of the plurality of holes of the electrostatic chuck may have a circular shape in a plan view.

Each of the plurality of holes of the electrostatic chuck may have a slot shape extending in one direction in a plan view, and each of the plurality of holes may overlap etching regions arranged along the one direction among the plurality of etching regions of the target substrate.

The electrostatic chuck may be divided into a first region in contact with the stage and a second region in contact with the target substrate and further include a first terminal part in the first region, and the stage may further include a second terminal part overlapping the first terminal part.

The electrostatic chuck may further include an elastic part disposed in the first region and connected to the first terminal part.

The electrostatic chuck may further include a protruding portion protruding from the surface of the electrostatic chuck in the first region, the stage may further include a recessed portion corresponding to a shape of the protruding portion and recessed from an upper surface of the stage, and the protruding portion may be coupled to the recessed portion.

The laser processing apparatus may further include a power supply unit, wherein the power supply unit may be electrically connected to the second terminal part.

The power supply unit may include a plurality of power source units configured to provide power and a power switching unit electrically connected to each of the plurality of power source units, and the power switching unit may be configure to provide the second terminal part with power applied from any one among the plurality of power source units.

The laser processing apparatus may further include a vacuum chamber, wherein the stage and the electrostatic chuck may be disposed inside the vacuum chamber, and the laser irradiation unit may be disposed outside the vacuum chamber.

The vacuum chamber may include: a body including a ceiling surface, a floor surface, and a plurality of side surfaces connecting the ceiling surface and the floor surface;

and a chamber window disposed in the ceiling surface, wherein the chamber window may overlap the laser irradiation unit in a plan view and transmit the laser beam.

According to another aspect of the invention, a laser processing apparatus includes a stage configured to transfer a target substrate, an electrostatic chuck divided into a first region in contact with the stage and a second region in contact with the target substrate, a laser irradiation unit disposed above the stage and spaced apart from the stage and configured to irradiate a laser beam on the target substrate, and a power supply unit, wherein: the electrostatic chuck includes a first terminal part disposed in the first region and a plurality of holes disposed in the second region; the stage includes an opening overlapping the second region and a second terminal part overlapping the first terminal part; and the power supply unit is electrically connected to the second terminal part.

The electrostatic chuck may further include a spring connected to the first terminal part.

The target substrate may be divided into a plurality of etching regions to be etched by the laser beam and a non-etching region surrounding the etching regions, the plurality of holes of the electrostatic chuck may overlap the plurality of etching regions of the target substrate, and planar areas of the plurality of holes of the electrostatic chuck may be greater than planar areas of the plurality of etching regions of the target substrate.

The plurality of holes of the electrostatic chuck may have circular or slot shapes in a plan view.

It is to be understood that both the foregoing general description and the following detailed description are illustrative and explanatory and are intended to provide further explanation of the invention as claimed.

BRIEF DESCRIPTION OF THE FIGURES

The accompanying drawings, which are included to provide a further understanding of the invention and are incorporated in and constitute a part of this specification, illustrate embodiments of the invention, and together with the description serve to explain the inventive concepts.

FIG. 12A is a cross-sectional view taken along line III-III' illustrating the laser processing apparatus of FIG. 11.

DETAILED DESCRIPTION

Figure 1:
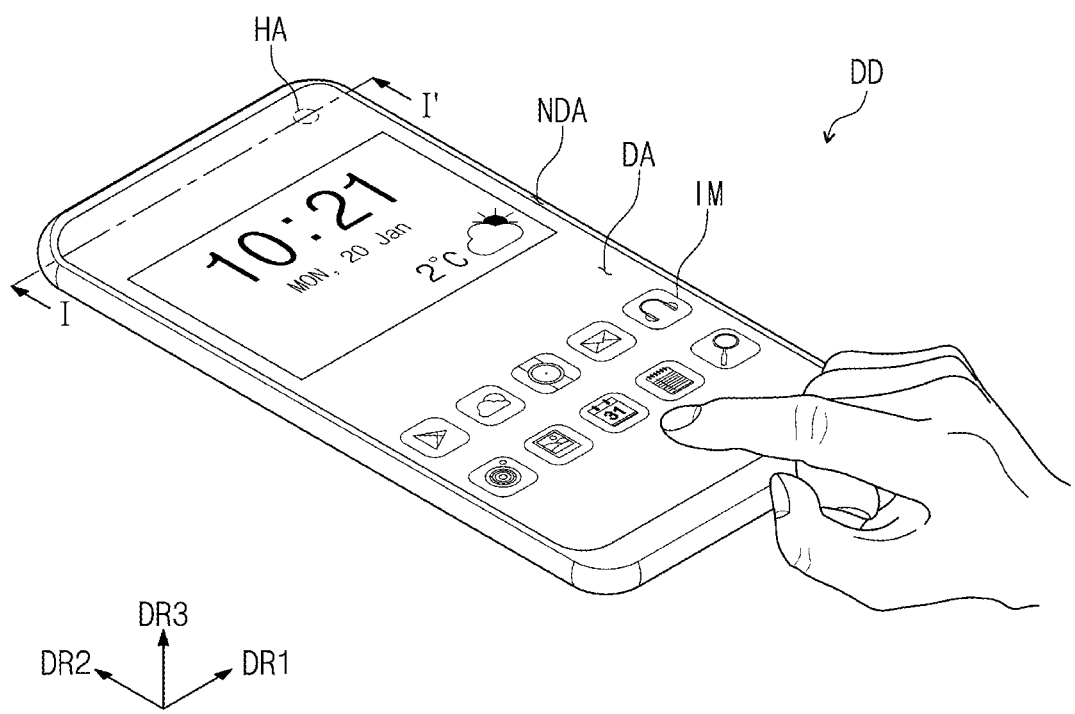
FIG. 1 is a perspective view of an embodiment of a display device constructed according to the principles of the invention.

In the following description, for the purposes of explanation, numerous specific details are set forth in order to provide a thorough understanding of various illustrative embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the x, y, and z-axes, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a perspective view of a display device according to an embodiment. Referring to FIG. 1, the display device DD may include a hole region HA, a display region DA, and a non-display region NDA.

The display device DD may be activated according to an electrical signal so as to display an image. For example, the display device DD may be used in electronic devices such as personal computers, notebook computers, car navigation systems, game machines, mobile phones, and tablets. However, they are examples, and the display device DD may be used in various electronic devices. The descriptions show, as an example, the display device DD used in a mobile phone.

The display device DD may be rigid. Embodiments are not limited thereto, and the display device DD may be flexible. For example, the flexible display device has a bendable characteristic, and the display device DD may have a structure in which the display device DD is completely folded or partially bent.

The front surface of the display device DD may be divided into a display region DA and a non-display region NDA. The display region DA may be a region in which an image IM is displayed. The non-display region NDA may be adjacent to the display region DA and may be a region in which an image IM is not displayed.

For example, in this embodiment, the front surface (e.g., upper surface) and the rear surface (e.g., lower surface) of each member are defined based on a direction in which the image IM is displayed. The front and rear surfaces are opposed to each other in a third direction DR3, and a normal direction of each of the front and rear surfaces may be parallel to the third direction DR3.

In the descriptions, the separation distance between the front surface and the rear surface defined along the third direction may correspond to a thickness of a member. In the descriptions, the expression "in a plan view" means that members are viewed from above, and means that the members are viewed from the third direction DR3.

First, second, and third Directions DR1, DR2, and DR3 indicated by first, second, and third directional axes illustrated in the drawings are relative concepts and may be converted to other directions.

The display device DD may provide a user with the image IM through the display region DA. The image IM may include at least one of a static image and a dynamic image. FIG. 1 illustrates a plurality of icons and a clock widget as an example of the image IM.

The display region DA may have a tetragonal shape parallel to a plane defined by the first direction DR1 and the second direction DR2. However, the shape of the display region DA is not limited thereto and may be designed in various shapes.

The non-display region NDA may be adjacent to the display region DA. The non-display region NDA may surround the display region DA. However, embodiments are not limited thereto, and the non-display region NDA may be disposed adjacent to only one side of the display region DA or may be omitted. The non-display region NDA may include a region on which a material including a predetermined color is printed.

The hole region HA may be a region overlapping an electronic module CAM to be described later. The hole region HA may be adjacent to the display region DA. The hole region HA may be surrounded by the display region DA. As the hole region HA overlapping the electronic module CAM is defined in the display region DA, the area of the non-display region NDA may be reduced.

FIG. 1 illustrates the hole region HA surrounded by the display region DA and formed in a right upper portion of the display region DA, but the position of the hole region HA is not limited thereto. For example, the hole region HA may be formed in a left, upper, or central portion thereof.

There may be one or more hole regions HA. Although FIG. 1 illustrates one hole region HA, the display device DD may include a plurality of hole regions. The plurality of hole regions may be spaced apart from each other and formed in the display region DA.

The hole region HA may have various shapes. FIG. 1 illustrates a hole region HA having a circular shape in a plan view. However, embodiments are not limited thereto, and the hole region HA may have a tetragonal shape.

The shape, area, number, and position of the hole region HA included in the display device DD may differ according to the design of the display device DD.

Figure 2A:
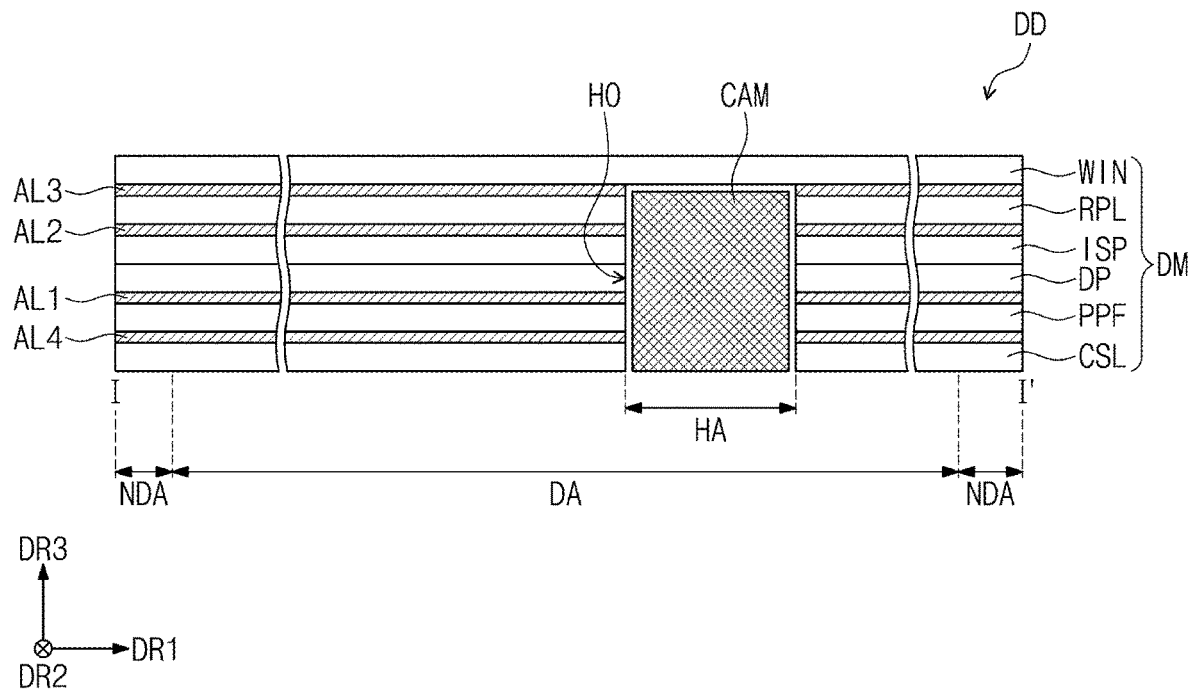
FIG. 2A is a cross-sectional view taken along line I-I' of FIG. 1 illustrating the display device of FIG. 1.
Figure 2B:
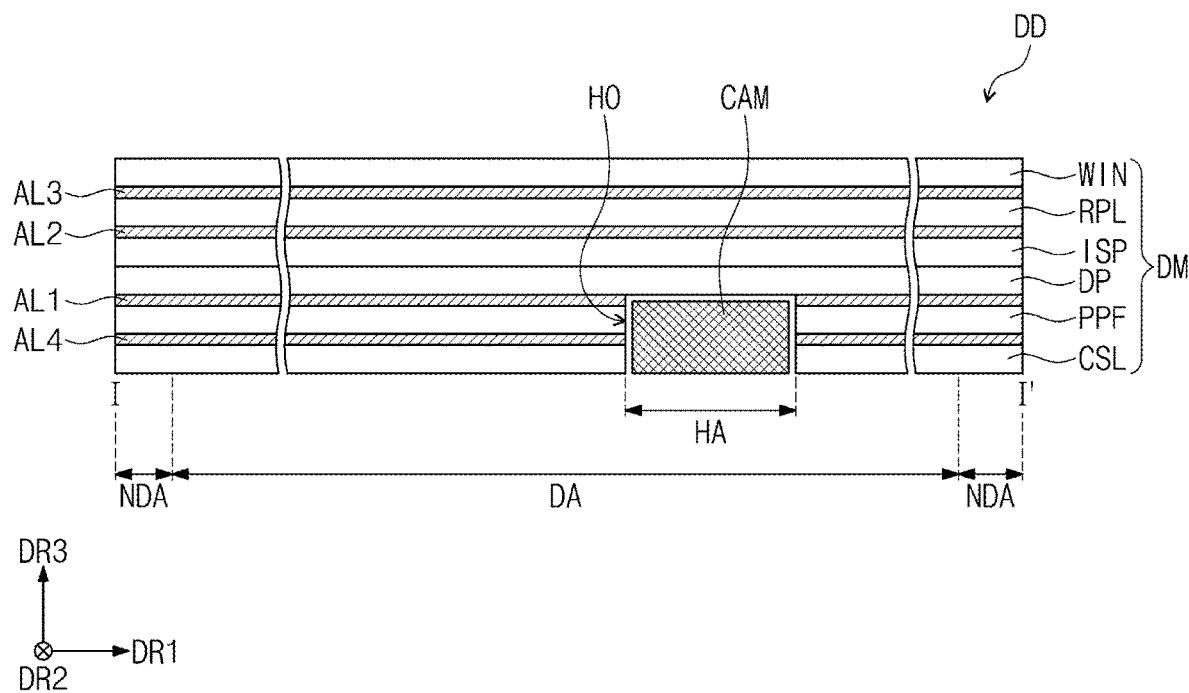
FIG. 2B is a cross sectional view taken along line I-I' of FIG. 1 illustrating another embodiment of the display device of FIG. 1.

FIGS. 2A and 2B are cross-sectional views of display device taken along line I-I' illustrated in FIG. 1. The display module DM may be a module included in the display device DD so as to display an image. The display module DM may include a display panel DP, an input sensing layer ISP, a reflection prevention layer RPL, a window WIN, a protective film PPF, a cushion layer CSL, and first, second, third, and fourth adhesive layers AL1, AL2, AL3, and AL4.

The display module DM may include a display region DA, a non-display region NDA, and a hole region HA. The display module DM may be defined a through-hole HO penetrating some members constituting the display module DM. The display modules DM illustrated in FIGS. 2A and 2B include substantially the same configuration, and there are some differences in the configuration in which the through-hole HO is defined.

The display panel DP may be a liquid crystal display panel or a light-emitting display panel and is not particularly limited thereto. For example, the display panel DP may be an organic light-emitting display panel or a quantum dot light-emitting display panel. The light-emitting layer of the organic light-emitting display panel may include an organic light-emitting material. The light-emitting layer of the quantum dot light-emitting display panel may include a quantum dot, a quantum rod and the like. Hereinafter, the display panel DP will be described as an organic light-emitting display panel.

The input sensing layer ISP may be disposed on the display panel DP. The input sensing layer ISP may be directly disposed on the display panel DP. For example, the input sensing layer ISP may be formed on the display panel DP through a continuous process. However, Embodiment are not limited thereto, and the input sensing layer ISP may be bonded to the display panel DP by an adhesive film disposed on the upper surface of the display panel DP.

The input sensing layer ISP may include a plurality of sensors for sensing an external input. The external input may include various forms of inputs which are applied from the outside of the display device DD. For example, the external input may include not only a touch by a part of a body such as a user's hand, but also various forms of external inputs (e.g., hovering) applied at a predetermined adjacent distance from the display device DD. In addition, the external input may include various forms of inputs such as force, pressure, temperature, and light.

The reflection prevention layer RPL may be disposed on the input sensing layer ISP. The reflection prevention layer RPL may reduce the reflectance of external light incident toward the display panel DP from the outside. The reflection prevention layer RPL may include a retarder and/or a polarizer. The reflection prevention layer RPL may be provided in the form of film.

The window WIN may be disposed on the reflection prevention layer RPL. The window WIN may protect the reflection prevention layer RPL, the input sensing layer ISP, and the display panel DP from external scratch and impact.

The window WIN may include an optically transparent material. For example, the window WIN may include glass, sapphire, plastic, and the like. An image generated from the display panel DP may be provided to a user through the window WIN.

The window WIN may have a single-layered structure or a multi-layered structure. For example, the window WIN may include a plurality of plastic films coupled to each other, or a glass substrate and a plastic film coupled to each other.

The protective film PPF may be disposed on the rear surface of the display panel DP. The protective film PPF may be defined as a protective substrate. The protective film PPF may protect the lower portion of the display panel DP. The protective film PPF may include a flexible plastic film. The protective film PPF may include organic materials. For example, the protective film PPF may include polyethylene terephthalate (PET), and the material of the protective film PPF is not limited to the above example.

The cushion layer CSL may be disposed below the protective film PPF. The cushion layer CSL may protect the display panel DP by absorbing an external impact applied to the lower portion of the display module DM. The cushion layer CSL may include a foam sheet having elasticity.

The first, second, third, and fourth adhesive layers AL1, AL2, AL3, and AL4 may be disposed between constituent members of the display module DM so as to bond each constituent member. The first adhesive layer AL1 may be disposed between the display panel DP and the protective film PPF so as to bond the display panel DP and the protective film PPF. The second adhesive layer AL2 may be disposed between the reflection prevention layer RPL and the input sensing layer ISP so as to bond the reflection prevention layer RPL and the input sensing layer ISP. The third adhesive layer AL3 may be disposed between the window WIN and the reflection prevention layer RPL so as to bond the window WIN and the reflection prevention layer RPL. The fourth adhesive layer AL4 may be disposed between the protective film PPF and the cushion layer CSL so as to bond the protective film PPF and the cushion layer CSL. However, Embodiment are not limited thereto, and some of the plurality of adhesive layers AL1, AL2, AL3, and AL4 may be omitted.

The electronic module CAM may overlap, in a plan view, the through-hole HO defined in the display module DM. The electronic module CAM may be inserted into the through-hole HO. The electronic module CAM may include various functional modules needed for operation of the display device DD. For example, the electronic module CAM may include a thermal sensing module, a light emitting module, an audio output module, a camera module, and the like.

The electronic module CAM may receive an external input transmitted from the outside through the hole region HA, or provide an output to the outside through the hole region HA. For example, the electronic module CAM may sense the information on an external subject, which is received through the hole region HA, or provide a sound signal such as a voice or an optical signal such as infrared light to the outside through the hole region HA.

The hole region HA may be defined in the display region DA. Therefore, in order to provide the hole region HA overlapping the electronic module CAM, a separate region provided in the non-display region NDA may be omitted. Accordingly, the area of the non-display region NDA may be reduced.

Referring to FIG. 2A, the through-hole HO according to an embodiment may be formed through the cushion layer CSL, the protective film PPF, the display panel DP, the input sensing layer ISP, and the reflection prevention layer RPL. For example, the hole region HA illustrated in FIG. 2A may overlap the window WIN in a plan view. Accordingly, the electronic module CAM may receive the external input or provide the output through the window WIN having a relatively high transmittance.

The through-hole HO according to another embodiment may be formed through components disposed below the display panel DP without penetrating the upper surface of the display panel DP. Referring to FIG. 2B, the through-hole HO may be formed through the cushion layer CSL and the protective film PPF disposed below the display panel DP.

The hole region HA illustrated in FIG. 2B may overlap the display panel DP in a plan view. Accordingly, an image provided from the display panel DP may be provided to a user through the hole region HA and the display region DA. The transmittance of the display panel DP overlapping the hole region HA may be higher than that of the display panel DP non-overlapping the hole region HA so that the electronic module CAM may easily transmit and receive a signal through the hole region HA.

For example, the through-hole HO may be formed by using a laser processing apparatus according to an embodiment, which will be described later. Specifically, the through-hole HO may be formed through an etching process for which the laser processing apparatus is used.

Figure 3:
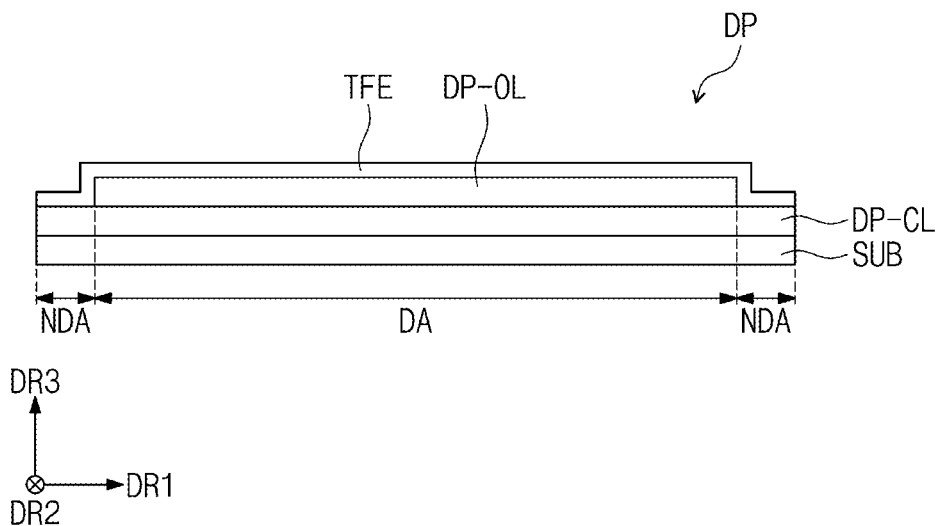
FIG. 3 is a cross-sectional view of a display panel of the display device of FIG. 1.

FIG. 3 is a cross-sectional view of a display panel according to an embodiment. The display panel DP may include a substrate SUB, a circuit layer DP-CL, a display element layer DP-OL, and an encapsulation layer TFE.

The substrate SUB may be a substrate in which the circuit layer DP-CL and the display element layer DP-OL are disposed. The substrate SUB may include at least one of a silicon substrate, a plastic substrate, and a glass substrate. The substrate SUB may have a stacked structure including a plurality of insulating layers.

The circuit layer DP-CL may be disposed on the substrate SUB. The circuit layer DP-CL may include at least one of an insulating layer and a circuit element. The circuit element may include a signal line, a driving circuit and the like. The circuit layer DP-CL may include a plurality of thin-film transistors. After an insulating layer, a semiconductor layer, and a conductive layer are stacked by coating or depositing, the circuit layer DP-CL may be formed by patterning the insulating layer, the semiconductor layer, and the conductive layer through a photolithography process.

The display element layer DP-OL may be disposed on the circuit layer DP-CL. The display element layer DP-OL may include a light-emitting element. For example, the light-emitting element may be an organic light-emitting diode or a quantum dot light-emitting diode.

The encapsulation layer TFE may be disposed on the display element layer DP-OL. The encapsulation layer TFE may include a plurality of thin films. The encapsulation layer may include at least one of an inorganic film and an organic film. Some thin films may be disposed to improve optical efficiency, and some thin films may be disposed to protect the light-emitting element from oxygen or moisture.

The display panel DP may include a plurality of pixels disposed in the display region DA. Each of the pixels may include a light-emitting element and a thin-film transistor electrically connected to the light-emitting element. The pixels may be disposed in the display region DA to emit light.

The display panel DP according to an embodiment illustrated in FIG. 2A may have a through-hole HO defined therein, the through-hole HO overlapping the hole region HA and penetrating the substrate SUB, the circuit layer DP-CL, and the display element layer DP-OL. The display panel DP according to an embodiment illustrated in FIG. 2B may have a relatively high transmittance in a region overlapping the hole region HA when compared to a region non-overlapping the hole region HA. For example, the density of the pixels in a region overlapping the hole region HA may be lower than that of the pixels in a region non-overlapping the hole region HA.

Figure 4:
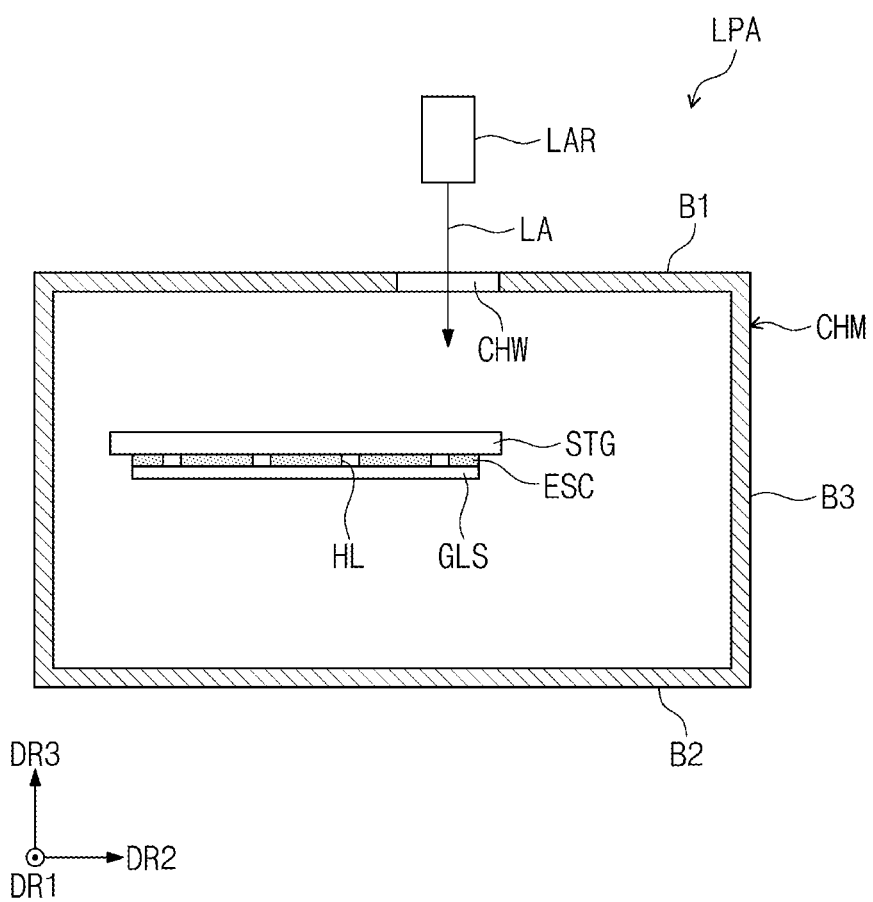
FIG. 4 is a cross-sectional view of an embodiment of a laser processing apparatus constructed according to the principles of the invention.

FIG. 4 is a cross-sectional view of a laser processing apparatus according to an embodiment. The laser processing apparatus LPA may be used for an etching process to form a through-hole HO penetrating stacked members of the display module DM described above. The laser processing apparatus LPA may include a vacuum chamber CHM, a stage STG, an electrostatic chuck ESC, and a laser irradiation unit LAR.

The laser irradiation unit LAR may be disposed on the stage STG and the electrostatic chuck ESC. The laser irradiation unit LAR may be disposed to be spaced apart from the stage STG and the electrostatic chuck ESC along the third direction DR3. The laser irradiation unit LAR may generate a laser beam LA. The laser irradiation unit LAR may irradiate the laser beam LA on a target substrate GLS mounted on the stage STG.

The target substrate GLS may be an object in which a hole is processed. The through-hole may be formed in the target substrate GLS through the etching process using the laser processing apparatus LPA. For example, the target substrate GLS may be the display panel DP and the input sensing layer ISP illustrated in FIG. 2A, but embodiments are not limited thereto, and the target substrate GLS may be a protective film PPF and a cushion layer CSL illustrated in FIG. 2B.

A plurality of display modules DM may be produced by processing one target substrate GLS. However, without being limited thereto, one display module DM may be produced by processing one target substrate GLS according to the area of the display module DM to be produced.

The stage STG may be disposed below the laser irradiation unit LAR. The stage STG may support the electrostatic chuck ESC. The stage STG may transfer the target substrate GLS attached to the stage STG by the electrostatic chuck ESC along one direction.

The electrostatic chuck ESC may be disposed on the stage STG. At least a portion of the rear surface of the electrostatic chuck ESC disposed on the stage STG may be exposed to the outside. A target substrate GLS may be provided on the exposed rear surface of the electrostatic chuck ESC. The target substrate GLS may come in contact with the rear surface of the electrostatic chuck ESC. The target substrate GLS may be attached to the rear surface of the stage STG by the electrostatic chuck ESC.

The electrostatic chuck ESC may be an electrostatic inductor. The electrostatic chuck ESC may include a body formed of ceramic or the like and an electrode embedded therein. As a voltage is applied to the electrode of the electrostatic chuck ESC, an electrostatic force may be induced or generated. The electrostatic chuck ESC, in which the electrostatic force is induced or generated, may apply an attractive force by the electrostatic force to the target substrate GLS, and the target substrate GLS may be in close contact with the electrostatic chuck ESC.

The electrostatic chuck ESC may include a plurality of holes HL. The plurality of holes HL may be formed through the upper and lower surfaces of the electrostatic chuck ESC. The plurality of holes HL may be disposed on the target substrate GLS so as to overlap a region irradiated by a laser beam LA. A detailed description of this will be described later.

The vacuum chamber CHM may provide a closed space during the etching process. For example, the inside of the vacuum chamber CHM may have a vacuum state during the etching process. The vacuum chamber CHM may include a ceiling surface B1, a floor surface B2, and a plurality of side surfaces B3. The floor surface B2 of the vacuum chamber CHM may be parallel to a plane defined by the first direction DR1 and the second direction DR2. The ceiling surface B1 and the floor surface B2 may face each other along the third direction DR3. The plurality of side surfaces B3 may surround and connect the ceiling surface B1 and the floor surface B2.

The stage STG and the electrostatic chuck ESC may be disposed inside the vacuum chamber CHM. The target substrate GLS may be provided inside the vacuum chamber CHM, and the etching process may be carried out in a vacuum condition. The laser irradiation unit LAR may be disposed outside the vacuum chamber CHM. The laser irradiation unit LAR may be disposed on the ceiling surface B1 of the vacuum chamber CHM to irradiate the laser beam LA on the target substrate GLS.

The vacuum chamber CHM may include a chamber window CHW disposed in the ceiling surface B1. The chamber window CHW may overlap the laser irradiation unit LAR in a plan view.

The chamber window CHW may transmit the laser beam LA. While maintaining the vacuum state of the vacuum chamber CHM, the chamber window CHW may transmit the laser beam LA emitted by the laser irradiation unit LAR disposed outside the vacuum chamber CHM. The chamber window CHW may be optically transparent. For example, the chamber window CHW may include glass.

Figure 5:
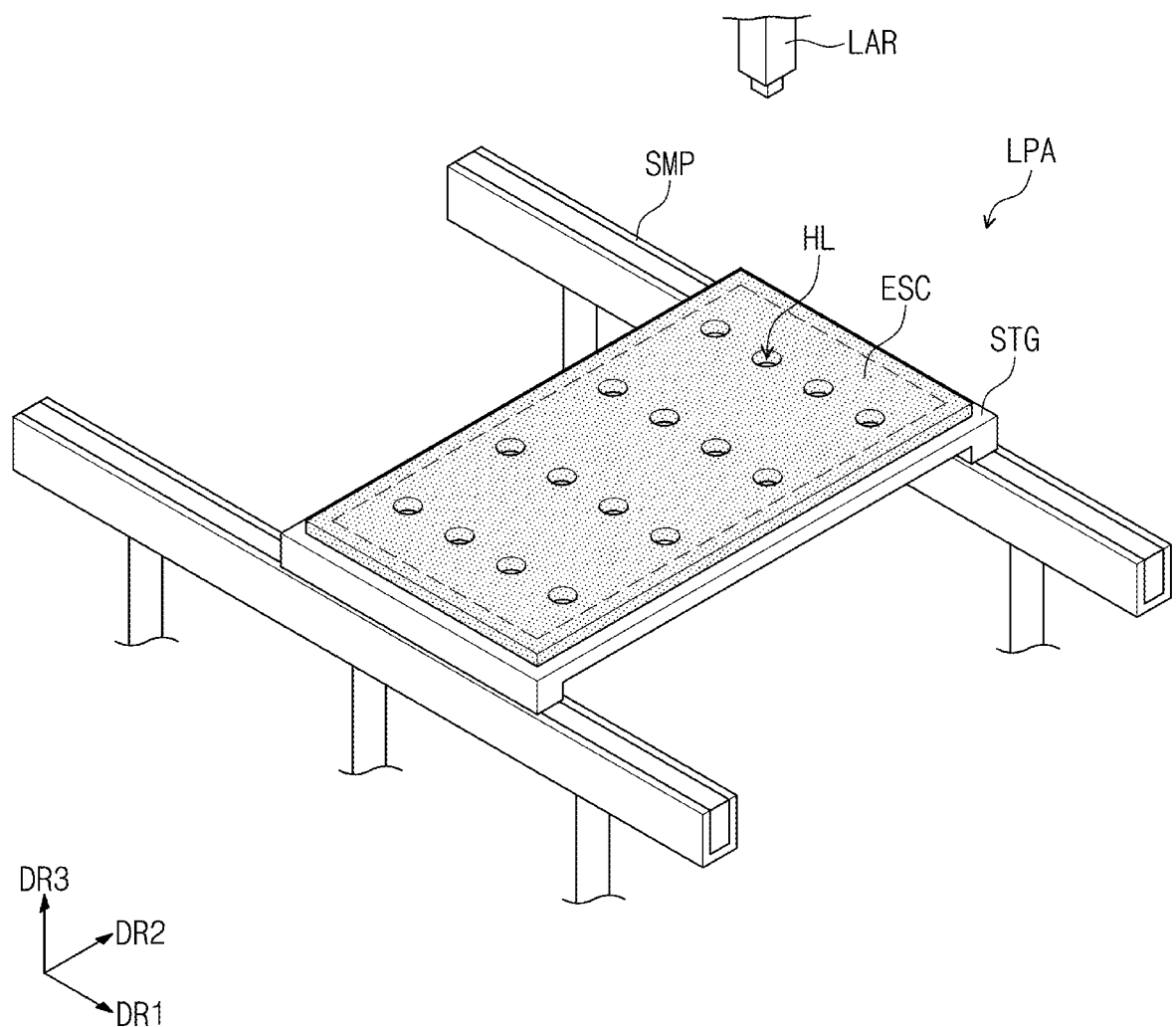
FIG. 5 is a perspective view of the laser processing apparatus of FIG. 4.
Figure 6:
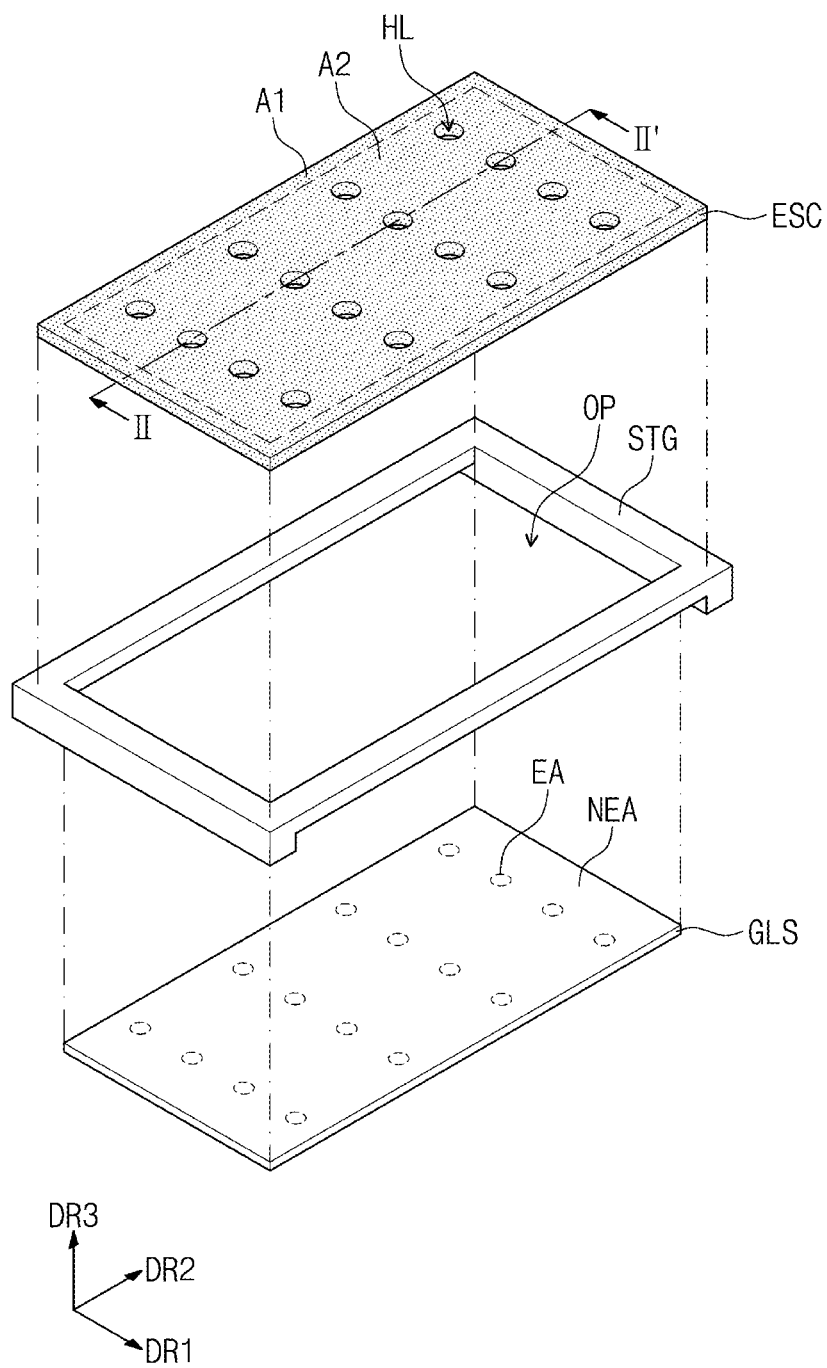
FIG. 6 is an exploded perspective view of the laser processing apparatus of FIG. 4.
Figure 7:
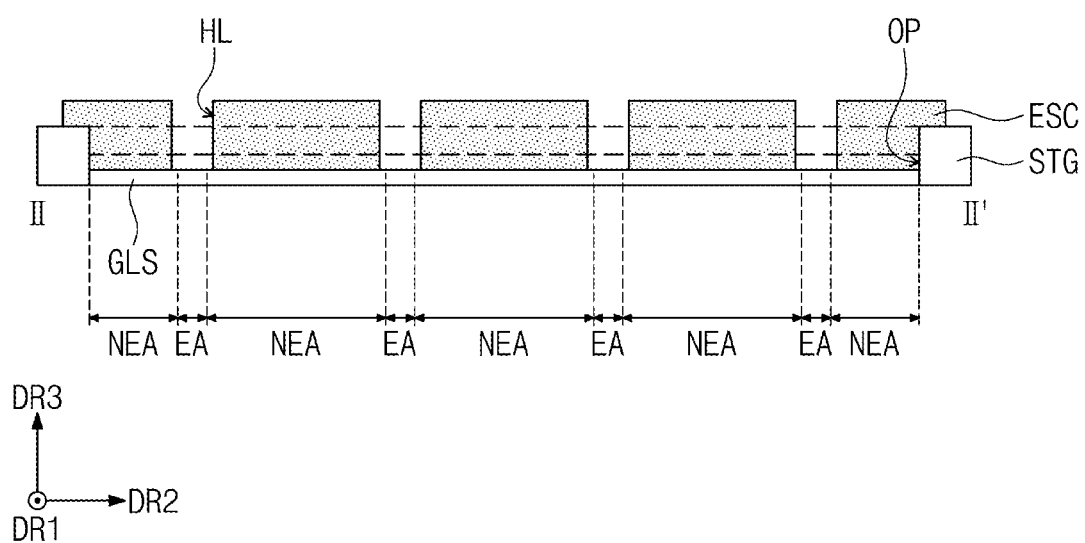
FIG. 7 is a cross-sectional view taken along line II-II' illustrating the laser processing apparatus of FIG. 6.

FIG. 5 is a perspective view of the laser processing apparatus according to an embodiment. FIG. 6 is an exploded perspective view of a partial configuration of the laser processing apparatus illustrated in FIG. 5. FIG. 7 is a cross-sectional view of a partial configuration of the laser processing apparatus illustrated in FIG. 6. The above description may be applied to the description of each component denoted by the same reference numeral for descriptive convenience.

Referring to FIG. 5, the laser processing apparatus LPA may include substrate moving parts SMP. The substrate moving parts SMP may extend along one direction. The substrate moving parts SMP may extend along a direction in which the stage STG moves. FIG. 5 illustrates, as an example, the substrate moving parts SMP extending along the first direction DR1. The substrate moving parts SMP extending along the first direction DR1 may be spaced apart from each other along the second direction DR2.

The substrate moving parts SMP may be disposed adjacent to and below both ends of the stage STG The substrate moving parts SMP may be disposed below both the ends of the stage STG extending along the first direction DR1.

The stage STG may move along the substrate moving parts SMP. The stage STG may move along a direction, in which the substrate moving parts SMP extend, and may move the target substrate GLS.

For example, the substrate moving parts SMP may include a moving device such as a motor. For example, the substrate moving parts SMP may include a linear motor or a rotary motor.

The thickness of the stage STG defined along the third direction DR3 may vary according to a region. For example, the thickness of the stage STG overlapping a separation space between the substrate moving parts SMP may be smaller than that of the stage STG overlapping the substrate moving parts SNIP. However, without being limited thereto, the thickness of the stage STG may be constant.

FIG. 6 is an exploded perspective view of the stage STG, the electrostatic chuck ESC, and the target substrate GLS according to an embodiment illustrated in FIG. 5. FIG. 7 illustrates a cross section of the stage STG, the electrostatic chuck ESC, and the target substrate GLS taken along line II-II' illustrated in FIG. 6. FIG. 7 illustrates the stage STG overlapping the electrostatic chuck ESC when viewed from the cross-section with a dotted-line for convenience of understanding.

Referring to FIGS. 6 and 7, the stage STG may include an opening OP. The opening OP may penetrate the upper and lower surfaces of the stage STG. The opening OP may overlap the separation space between the substrate moving parts SMP. The opening OP may have a tetragonal shape in a plan view. However, the shape of the opening OP is not necessarily limited thereto.

The electrostatic chuck ESC may have a tetragonal shape in a plan view. As illustrated in FIG. 6, the electrostatic chuck ESC may have, in a plan view, a rectangular shape having short sides extending along the first direction DR1 and long sides extending along the second direction DR2.

The electrostatic chuck ESC may be divided into a first region A1 overlapping the upper surface of the stage STG and a second region A2 overlapping the opening OP. The rear surface of the first region A1 of the electrostatic chuck ESC may be supported by the stage STG. The rear surface of the second region A2 of the electrostatic chuck ESC may be exposed through the opening OP. A portion of the electrostatic chuck ESC overlapping the opening OP may be inserted into the opening OP. However, the shape of the electrostatic chuck ESC is not limited to any one embodiment as long as the target substrate GLS can be mounted on the stage STG by using electrostatic attraction.

The target substrate GLS may be divided into an etching region EA, on which a laser beam LA is irradiated to be etched, and a non-etching region NEA surrounding the etching region EA. The etching region EA may be provided in plurality. The etching region EA may correspond to the hole region HA of the display module DM described above, and may be a region in which a through-hole HO is formed.

The target substrate GLS may be disposed on the rear surface of the electrostatic chuck ESC exposed through the opening OP. The front surface of the target substrate GLS may come in contact with the rear surface of the electrostatic chuck ESC.

The plurality of holes HL of the electrostatic chuck ESC may overlap the opening OP and the plurality of etching regions EA. The plurality of holes HL may correspond to the plurality of etching regions EA and be arranged along the first direction DR1 and the second direction DR2. The laser beam LA generated by the laser irradiation unit LAR may pass through the plurality of holes HL and the opening OP so as to irradiate the laser beam LA on the plurality of etching regions EA of the target substrate GLS.

The planar area of the hole HL of the electrostatic chuck ESC may be larger than the planar area of the etching region EA overlapping the hole HL in a plan view. For example, the planar area of the hole HL of the electrostatic chuck ESC may be twice the planar area of the etching region EA overlapping the hole HL. However, the planar area of the hole is not limited to the above figure. For example, in this specification, the planar area means the area of a configuration in a plan view. Since the planar area of the hole HL is larger than the planar area of the etching region EA, it is possible to prevent a phenomenon in which the laser beam LA cannot be irradiated on the etching region EA due to a process error.

The position, planar area, and number of a plurality of holes HL may differ according to the etching regions EA of the target substrate GLS to be produced through an etching process. For example, the etching regions EA of the target substrate GLS may differ according to production models of the display device DD. Therefore, the position, planar area, and number of holes HL of the electrostatic chuck ESC to be used in the production process of the display device DD may differ according to models of the display device DD to be produced. However, without being limited thereto, one electrostatic chuck ESC may be used as a common electrostatic chuck to produce different models of display devices.

Figure 8A:
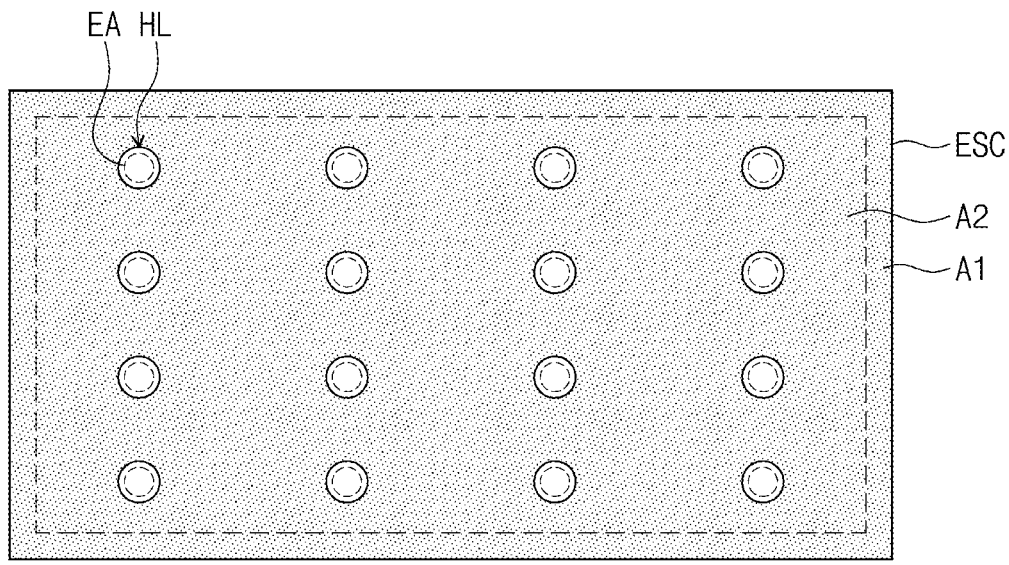
FIG. 8A is a plan view of an embodiment of an electrostatic chuck of the laser processing apparatus of FIG. 4.
Figure 8A:
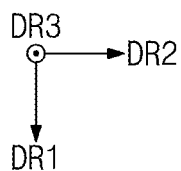
Figure 8B:
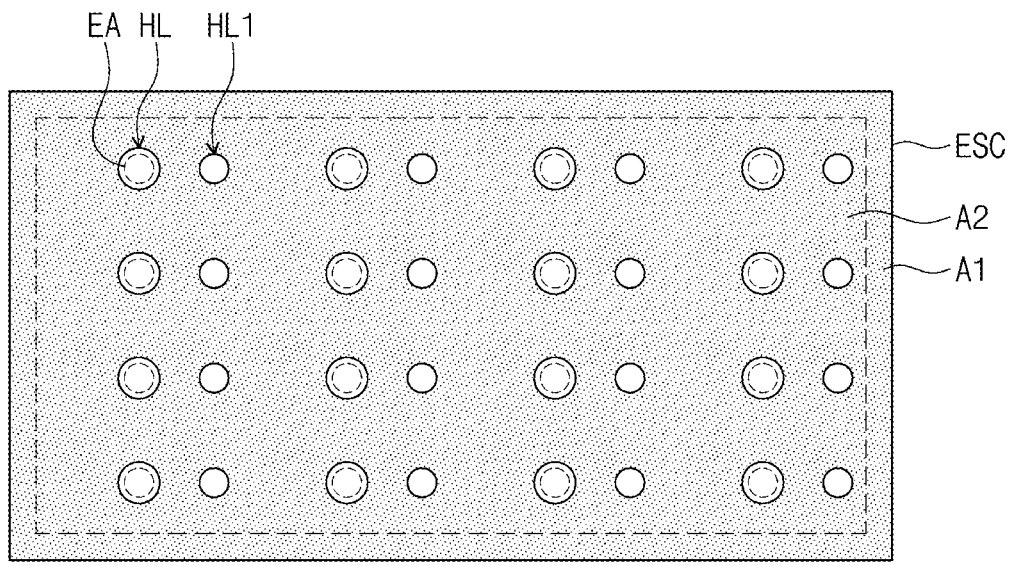
FIG. 8B is a plan view of another embodiment of the electrostatic chuck of the laser processing apparatus of FIG. 4.
Figure 8B:
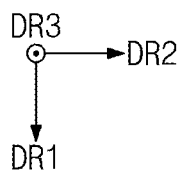
Figure 8C:
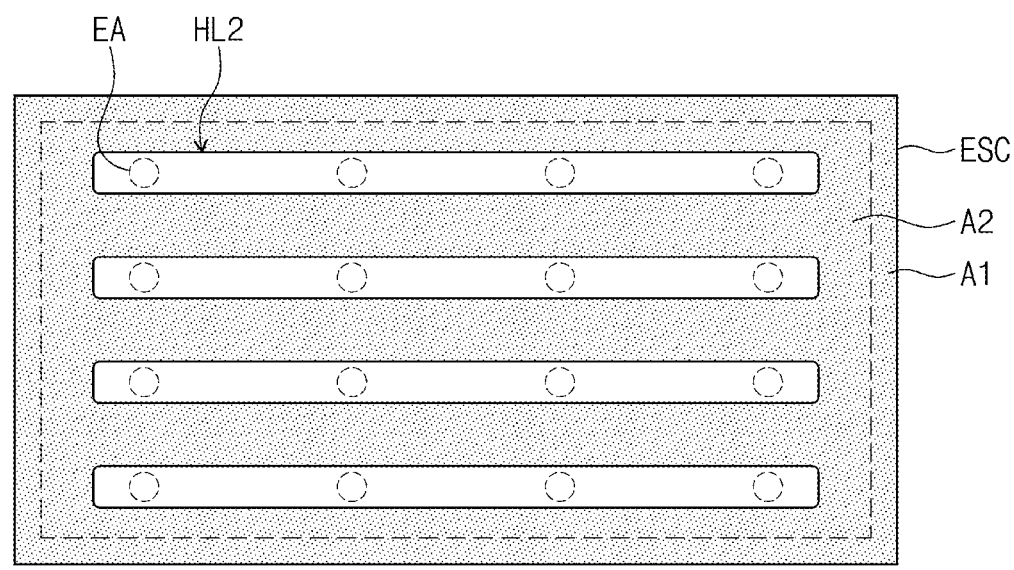
FIG. 8C is a plan view of another embodiment of the electrostatic chuck of the laser processing apparatus of FIG. 4.
Figure 8C:
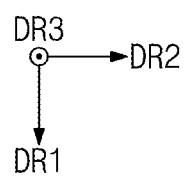

FIGS. 8A, 8B, and 8C are plan views of electrostatic chucks according to an embodiment. The descriptions given above may be applied to the electrostatic chucks ESC illustrated in FIGS. 8A, 8B, and 8C for descriptive convenience. The embodiments of the electrostatic chucks ESC illustrated in FIGS. 8A, 8B, and 8C may differ in the number, area, and shape of the holes HL, and mostly, differences will be described hereinafter. For the convenience of description, FIGS. 8A, 8B, and 8C illustrate the etching regions EA of the target substrate GLS overlapping the holes HL.

Referring to FIG. 8A, the plurality of holes HL of the electrostatic chuck ESC may be disposed to correspond to the plurality of etching regions EA. For example, the plurality of holes HL of the electrostatic chuck ESC may overlap the plurality of etching regions EA, respectively. For example, one hole HL may overlap one etching region EA. All of the plurality of holes HL may overlap the corresponding etching region EA.

The planar areas of the plurality of holes HL may be substantially the same as each other. The plurality of holes HL may have a circular shape in a plan view. However, without being limited thereto, the planar areas and shapes of the holes HL may vary according to the planar areas and shapes of the etching regions EA corresponding to and overlapping the holes HL.

Referring to FIG. 8B, with regard to one target substrate GLS, some holes HL among the plurality of holes HL and HL1 of the electrostatic chuck ESC may overlap the plurality of etching regions EA, and the remaining holes HL1 may overlap the non-etching region NEA. Hereinafter, for the convenience of description, in the embodiment of the electrostatic chuck ESC illustrated in FIG. 8B, the some holes HL overlapping the etching regions EA are referred to as first holes HL, and the remaining holes HL1 overlapping the non-etching region NEA are referred to as second holes HL1.

The positions and/or planar areas of the etching regions EA of the target substrate GLS may differ according to production models of the display device DD. For example, based on the electrostatic chuck ESC illustrated in FIG. 8B, the plurality of etching regions EA of the target substrate GLS of a first production model may be defined at positions overlapping the first holes HL. For example, the etching regions of the target substrate of a second production model may be defined at positions non-overlapping the first holes HL and overlapping the second holes HL1.

The first holes HL may overlap the etching regions EA in an etching process of the target substrate GLS of the first production model. However, the first holes HL may not overlap the etching regions and overlap the non-etching region in the etching process of the target substrate of the second production model. Likewise, the second holes HL1 may not overlap the etching regions EA in an etching process of the target substrate GLS of the first production model and overlap the etching regions in an etching process of the target substrate of the second production model. Therefore, according to the production model of the target substrate GLS, the plurality of holes HL and HL1 included in one electrostatic chuck ESC may or may not overlap the etching regions EA of the target substrate GLS.

One electrostatic chuck ESC may be used in the etching process of target substrates of different production models. For example, one electrostatic chuck ESC may be used for the target substrate of the first production model including the etching regions EA which overlap the first holes HL and also for the target substrate of the second production model including the etching regions EA which overlap the second holes HL1. In this way, the operation of producing and replacing electrostatic chucks according to production models may be omitted, and various production models of the display device may be efficiently mass-produced.

For example, although the first and second production models are exemplarily described, the types of production models that can be produced by one electrostatic chuck ESC may be more diverse according to the holes included in the electrostatic chuck ESC.

The planar areas of at least two holes among the plurality of holes HL and HL1 may be different from each other. As illustrated in FIG. 8B, the planar areas of the first holes HL and the planar areas of the second holes HL1 may be different from each other. However, without being limited thereto, the planar areas of the first holes HL and the planar areas of the second holes HL1 may be substantially the same as each other.

Referring to FIG. 8C, one hole HL2 included in a plurality of holes HL2 of the electrostatic chuck ESC may overlap some etching regions EA among a plurality of etching regions EA. The one hole HL2 may overlap the plurality of etching regions EA arranged along one direction. As illustrated in FIG. 8C, each of the plurality of holes HL2 may overlap four etching regions EA arranged along the second direction DR2. However, this is just exemplary, and the number of the etching regions EA overlapping one hole HL2 is not limited to what is illustrated.

The hole HL2 may have a slot shape in a plan view. The slot shape may include short sides extending along the first direction DR1 and long sides extending along the second direction DR2. Each of the holes HL2 may have a slot shape extending along the second direction DR2 and overlap some of the plurality of etching regions EA arranged along the second direction DR2.

As the holes HL2 have a slot shape, the restriction on the position of the etching regions EA overlapping the holes HL2 is reduced when compared to holes having a circular shape. Therefore, the types of production models that can be produced by one electrostatic chuck ESC may be relatively diverse and varied.

For example, the numbers, shapes, and planar areas of the holes HL, HL1, and HL2 illustrated FIGS. 8A, 8B, and 8C are exemplary, may vary according to the etching regions EA of the target substrate GLS, and are not limited to any one embodiment.

Figure 9:
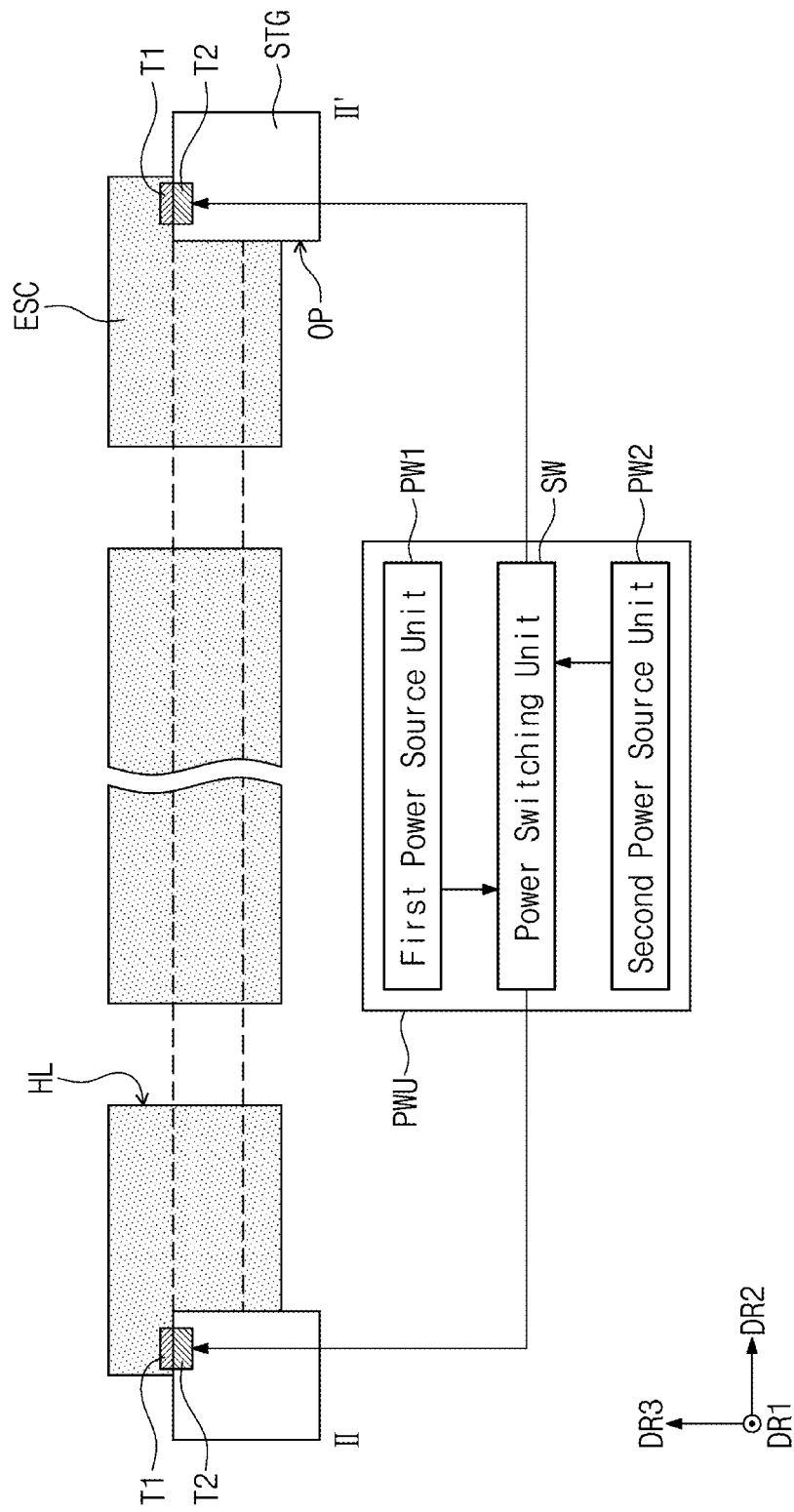
FIG. 9 is a cross-sectional view of another embodiment taken along line II-II' illustrating the laser processing apparatus of FIG. 6.

FIG. 9 is the cross-sectional view of another embodiment taken along line II-II' illustrating the laser processing apparatus of FIG. 6. The descriptions given above may be applied to the descriptions of the electrostatic chuck ESC and the stage STG illustrated in FIG. 9 for descriptive convenience, and mostly, differences will be described later. FIG. 9 illustrates the stage STG overlapping the electrostatic chuck ESC when viewed from the cross-section with a dotted-line for convenience of understanding.

The electrostatic chuck ESC may include a first terminal part T1. The first terminal part T1 may be provided in plurality, and the first terminal parts T1 may be disposed to be spaced apart from each other. The first terminal parts T1 may be disposed in the first region A1 (refer to FIG. 6) in contact with the upper surface of the stage STG.

The first terminal part T1 may include a material having conductivity. The electrostatic chuck ESC may induce an electrostatic force since a voltage is applied through the first terminal part T1.

The stage STG may include a second terminal part T2. The second terminal part T2 may be provided in plurality, and the second terminal parts T2 may be disposed to be spaced apart from each other.

The second terminal part T2 may overlap the first terminal part T1 in a plan view. The second terminal part T2 may be electrically connected to the first terminal part T1. The second terminal part T2 may contact with the first terminal part T1.

The laser processing apparatus may include a power supply unit PWU. The power supply unit PWU may be electrically connected to the second terminal part T2 of the stage STG. The power supply unit PWU may include lines to be connected to the second terminal part T2 and may be directly connected to the second terminal part T2 through the lines.

A voltage may be applied to the second terminal part T2 by the power supply unit PWU. The voltage applied to the second terminal part T2 may be transmitted to the first terminal part T1. Therefore, the first terminal part T1 may receive the voltage provided by the power supply unit PWU without being directly connected to the lines of the power supply unit PWU.

The electrostatic chuck ESC may need to be replaced according to the production model of the target substrate GLS to be etched. When the power supply unit PWU is directly connected to the electrostatic chuck ESC, it is necessary to separate the lines connected to the electrostatic chuck ESC in order to another replace the electrostatic chuck. However, in the case of the electrostatic chuck ESC including the first terminal part T1 which receives a voltage provided by the power supply unit PWU through the second terminal part T2 of the stage STG, the work of separating the lines for replacement may be omitted. Accordingly, the time for replacing the electrostatic chuck ESC may be shortened.

The power supply unit PWU may include a plurality of power source units PW1 and PW2 and a power switching unit SW. Each of the plurality of power source units PW1 and PW2 may be electrically connected to the power switching unit SW. One among the plurality of power source units PW1 and PW2 may provide power to the power switching unit SW.

The power switching unit SW may select a power source unit, which provides power to the second terminal part T2, among the plurality of power source units PW1 and PW2. For example, the plurality of power source units PW1 and PW2 may include the first power source unit PW1 and the second power source unit PW2. The power switching unit SW may select a power source unit among the first and second power source units PW1 and PW2, and the selected power source unit may provide power to the second terminal part T2.

In the case of a failure of one of the plurality of power source units PW1 and PW2 during a process, the power switching unit SW may select another power source unit, which can normally operate, among the plurality of power source units PW1 and PW2 so that power may be supplied without delay. For example, the first power source unit PW1 among the plurality of power source units PW1 and PW2 may provide power to the second terminal part T2 and the first terminal part T1 through the power switching unit SW. However, in the case of a failure of the first power source unit PW1 during a process, power may not be provided to the second terminal part T2 and the first terminal part T1. In this case, the second power source unit PW2 may provide power, and the power switching unit SW may provide power provided by the second power source unit PW2 to the second terminal part T2 and the first terminal part T1 so that the process can be continued without any interruption. Accordingly, a loss caused by production interruption due to power failure may be minimized.

For example, the embodiment of the power supply unit PWU is not limited thereto and may include one power source unit electrically connected to the second terminal part T2.

Figure 10A:
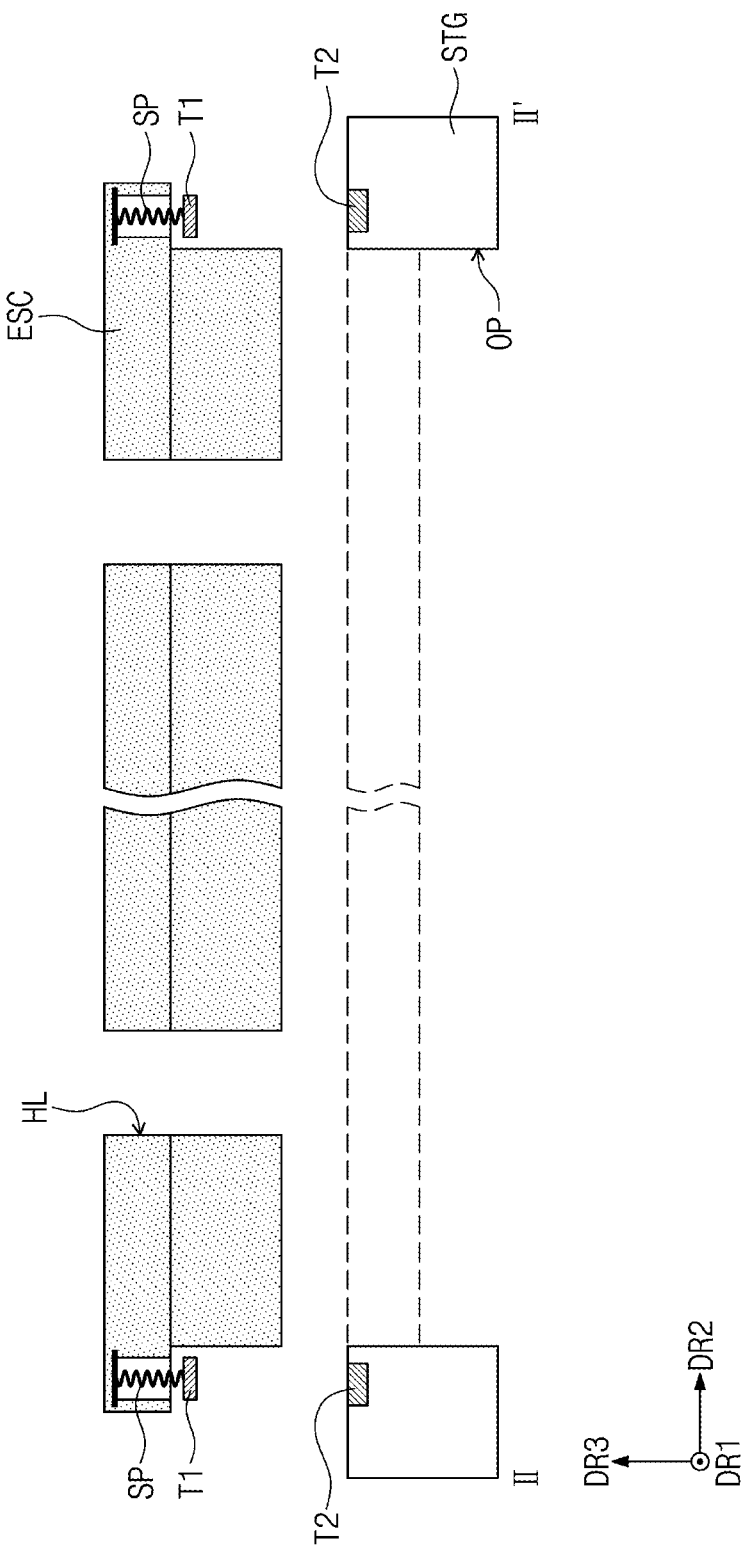
FIG. 10A is a cross-sectional view of another embodiment taken along line II-II' illustrating the laser processing apparatus of FIG. 6 before mounting the electrostatic chuck on a stage of the laser processing apparatus.
Figure 10B:
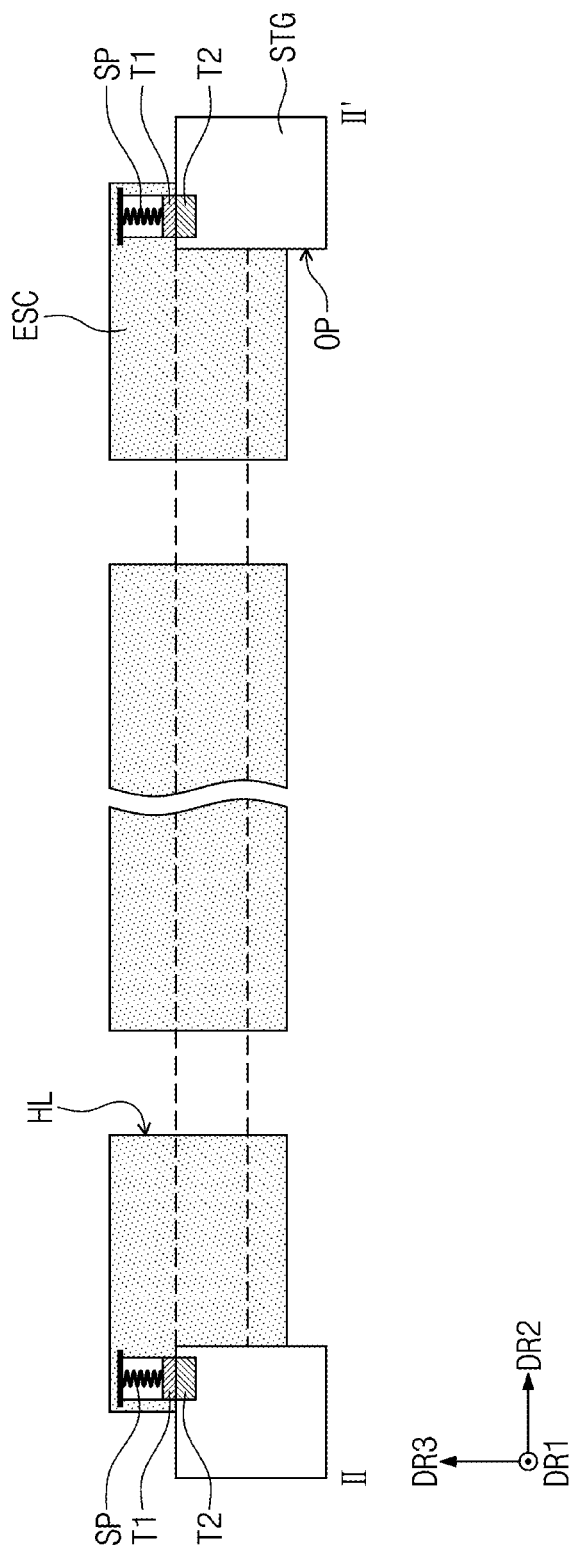
FIG. 10B is a cross-sectional view of another embodiment taken along line illustrating the laser processing apparatus of FIG. 6 after mounting the electrostatic chuck on the stage of the laser processing apparatus.

FIGS. 10A and 10B are cross-sectional views of another embodiments taken along line II-II' illustrating the laser processing apparatus of FIG. 6. FIG. 10A is a cross-sectional view before mounting the electrostatic chuck ESC of one embodiment on the stage STG, and FIG. 10B is a cross-sectional view after mounting, on the stage STG, the electrostatic chuck ESC illustrated in FIG. 10A. The descriptions given above may be applied to the configurations illustrated in FIG. 10A for descriptive convenience. FIGS. 10A and 10B illustrate the stage STG overlapping the electrostatic chuck ESC when viewed from the cross-section with a dotted-line for convenience of understanding.

The electrostatic chuck ESC may include an elastic part SP. The elastic part SP may be connected to the first terminal part T1. The elastic part SP may be coupled to the body of the electrostatic chuck ESC and one surface of the first terminal part T1 to connect the first terminal part T1 to the body of the electrostatic chuck ESC. The elastic part SP may be provided in plurality and connected to each of the plurality of first terminal parts T1.

The elastic part SP may have a predetermined elasticity. For example, the elastic part SP may include a spring.

Referring to FIG. 10B, when the electrostatic chuck ESC is mounted on the stage STG, the elastic part SP may be compressed along the third direction DR3. The elastic part SP may be compressed by receiving a compressive force along the third direction DR3 by a load of the electrostatic chuck ESC pressing in a direction opposite to the third direction DR3.

The first terminal part T1 connected to the elastic part SP may be mounted on the second terminal part T2 while maintaining flatness. Accordingly, the electrostatic chuck ESC may be mounted on the stage STG without tilting. When the electrostatic chuck ESC is replaced, the replaced electrostatic chuck may also be mounted on the stage STG while maintaining flatness, and the reliability of the laser processing apparatus may be maintained.

Figure 11:
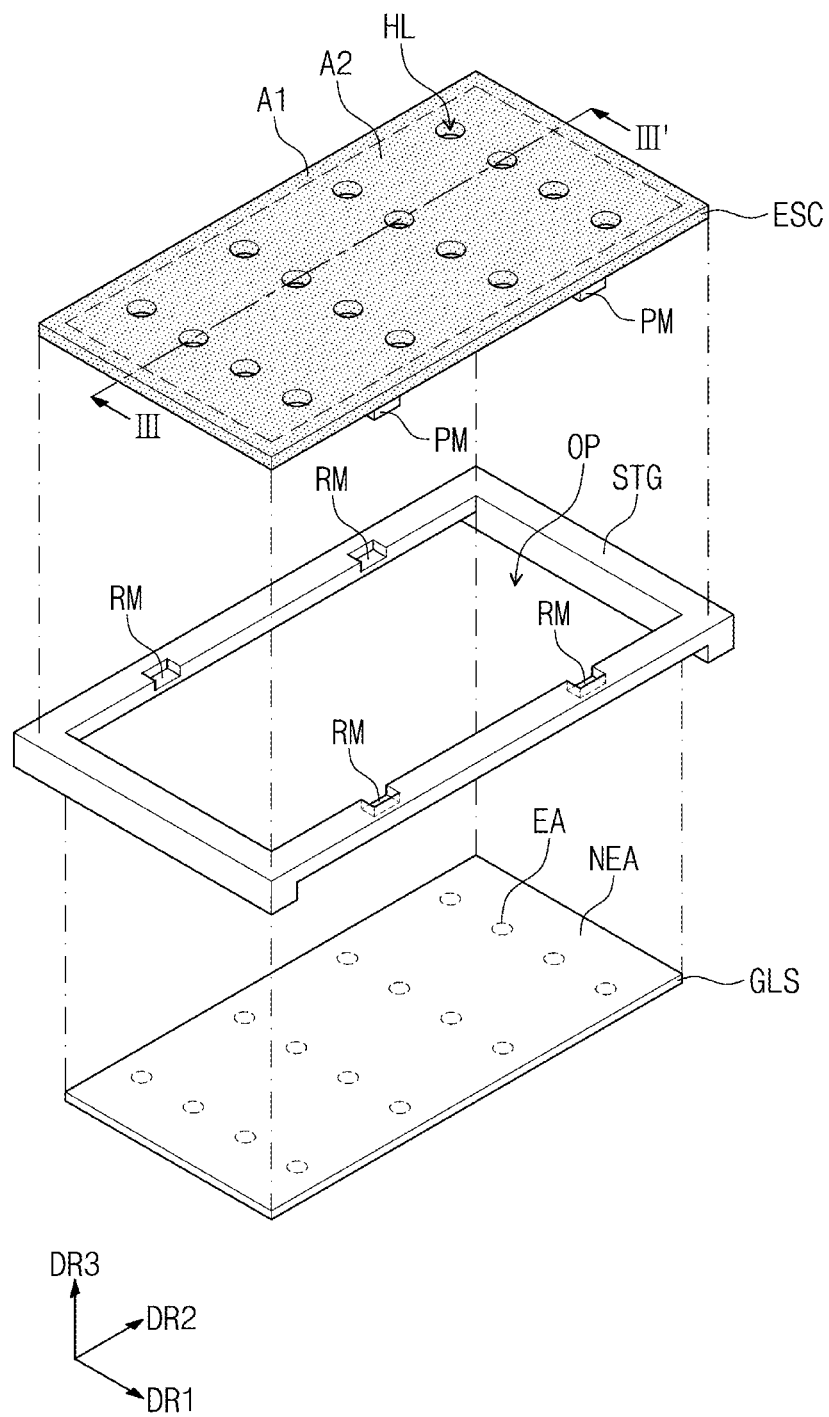
FIG. 11 is an exploded perspective view of another embodiment of the laser processing apparatus of FIG. 4.

FIG. 11 is an exploded perspective view of another embodiment of the laser processing apparatus of FIG. 4. The laser processing apparatus illustrated in FIG. 11 includes substantially the same configuration as the laser processing apparatus illustrated in FIG. 6, but there are differences in some configurations, and mostly, the differences will be described later.

Figure 12B:
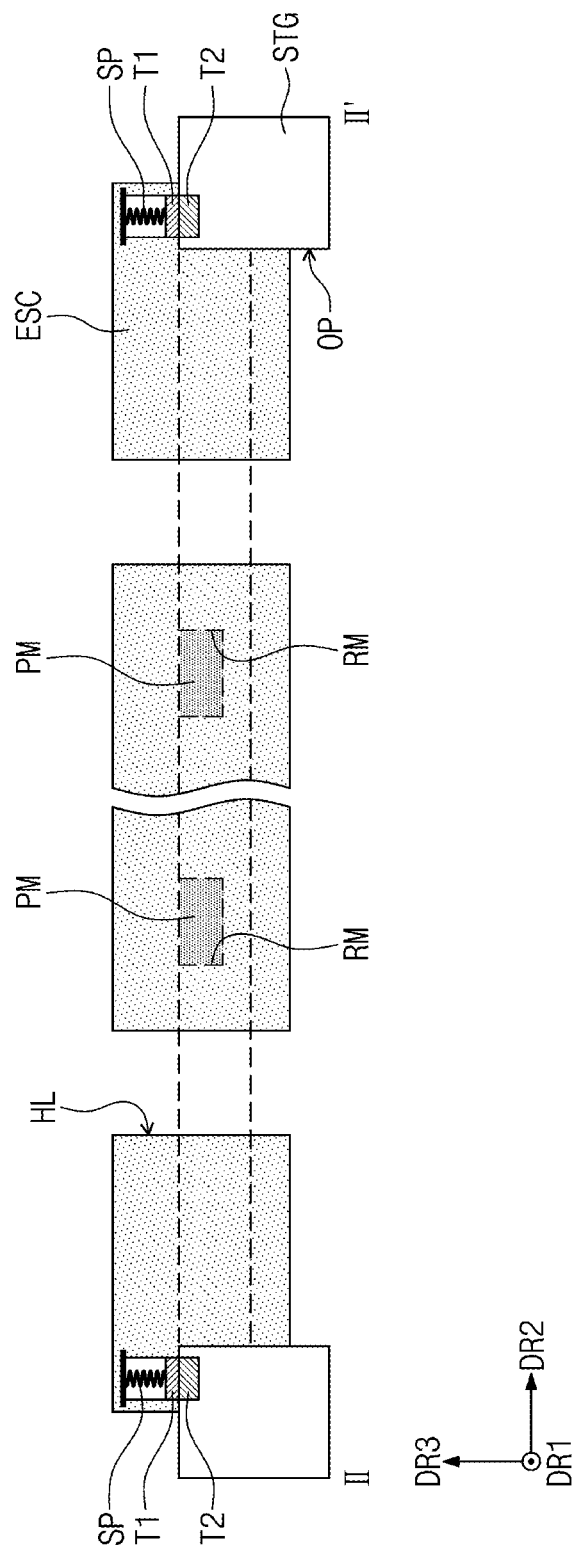
FIG. 12B is a cross-sectional view taken along line III-III' illustrating the laser processing apparatus of FIG. 11.

FIGS. 12A and 12B are cross-sectional views of another embodiments taken along line III-III' illustrating the laser processing apparatus of FIG. 11. FIG. 12A is a cross-sectional view before mounting the electrostatic chuck ESC of one embodiment on the stage STG, and FIG. 12B is a cross-sectional view after mounting, on the stage STG, the electrostatic chuck ESC illustrated in FIG. 12A. FIGS. 12A and 12B illustrate the stage STG overlapping the electrostatic chuck ESC when viewed from the cross-section with a dotted-line for convenience of understanding. The laser processing apparatus illustrated in FIG. 12A includes substantially the same configuration as the laser processing apparatus illustrated in FIG. 10A, but there are differences in some configurations, and mostly, the differences will be described later.

Referring to FIG. 11, the electrostatic chuck ESC may include a protruding portion PM. The protruding portion PM may be disposed in the first region A1 in contact with the upper surface of the stage STG. The protruding portion PM may be a portion protruding toward the stage STG from the rear surface of the electrostatic chuck ESC of the first region A1.

The stage STG may include a recessed portion RM. The recessed portion RM may be a portion recessed from the upper surface of the stage STG overlapping the first region A1. The recessed portion RM may overlap the protruding portion PM in a plan view. The shape of the recessed portion RM may correspond to the shape of the protruding portion.

Referring to FIGS. 12A and 12B, when the electrostatic chuck ESC is mounted on the stage STG, the protruding portion PM may be mounted while being inserted into the recessed portion RM corresponding to the shape of the protruding portion PM. The protruding portion PM may be coupled to the recessed portion RM while coming in contact with the inner surface of the recessed portion RM.

As the protruding portion PM is mounted while being inserted into the recessed portion RM, the electrostatic chuck ESC may be mounted in an exact mounting position while maintaining flatness without tilting. When the electrostatic chuck ESC is replaced, the replaced electrostatic chuck may also be mounted in an exact position on the stage STG while maintaining flatness, and the reliability of the laser processing apparatus may be maintained.

The laser processing apparatus according to an embodiment may maintain reliability and be suitable for mass production of display devices. The electrostatic chuck included in the laser processing apparatus according to an embodiment may be used as a common electrostatic chuck for producing display devices having different position of hole regions, and a process of producing different electrostatic chucks and a process of replacing electrostatic chucks according to production models may be omitted. Accordingly, it is possible to efficiently produce various production models of display devices by shortening the process time for production thereof with the use of the laser processing apparatus.

The laser processing apparatus according to an embodiment may shorten the time for replacing the electrostatic chuck when the electrostatic chuck is replaced, and the electrostatic chuck may be replaced without deteriorating the flatness of the replaced electrostatic chuck. The laser processing apparatus according to an embodiment may prevent a loss due to process interruption by minimizing process delay due to power failure.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:
1. A laser processing apparatus comprising:
 a stage configured to transfer a target substrate and comprising an opening;
 an electrostatic chuck disposed on the stage and comprising a plurality of holes; and a laser irradiation unit disposed above the stage and spaced apart from the stage and configured to irradiate a laser beam on the target substrate, wherein:
a surface of the electrostatic chuck is in contact with the target substrate;
the target substrate comprises a plurality of etching regions to be etched by the laser beam and a non-etching region surrounding the etching regions; and
the plurality of holes of the electrostatic chuck overlap the opening of the stage and the etching regions of the target substrate.

2. The laser processing apparatus of claim 1, wherein planar areas of the plurality of holes of the electrostatic chuck are greater than planar areas of the plurality of etching regions of the target substrate overlapping the plurality of holes of the electrostatic chuck.

3. The laser processing apparatus of claim 1, wherein planar areas of the plurality of holes of the electrostatic chuck are substantially the same as each other.

4. The laser processing apparatus of claim 1, wherein planar areas of at least two holes among the plurality of holes of the electrostatic chuck are different from each other.

5. The laser processing apparatus of claim 1, wherein the plurality of holes of the electrostatic chuck are disposed to overlap the plurality of etching regions of the target substrate, respectively.

6. The laser processing apparatus of claim 1, wherein some of the plurality of holes of the electrostatic chuck are disposed to overlap the plurality of etching regions of the target substrate, respectively.

7. The laser processing apparatus of claim 1, wherein at least one of the plurality of holes of the electrostatic chuck is disposed to overlap some of the plurality of etching regions of the target substrate.

8. The laser processing apparatus of claim 1, wherein each of the plurality of holes of the electrostatic chuck has a circular shape in a plan view.

9. The laser processing apparatus of claim 1, wherein each of the plurality of holes has a slot shape extending in one direction in a plan view, and each of the plurality of holes is disposed to overlap etching regions arranged along the one direction among the plurality of etching regions of the target substrate.

10. The laser processing apparatus of claim 1, wherein:
the electrostatic chuck is divided into a first region in contact with the stage and a second region in contact with the target substrate and further comprises a first terminal part in the first region; and
the stage further comprises a second terminal part overlapping the first terminal part.

11. The laser processing apparatus of claim 10, wherein the electrostatic chuck further comprises an elastic part disposed in the first region and connected to the first terminal part.

12. The laser processing apparatus of claim 11, wherein:
the electrostatic chuck further comprises a protruding portion protruding from the surface of the electrostatic chuck in the first region;
the stage further comprises a recessed portion corresponding to a shape of the protruding portion and recessed from an upper surface of the stage; and
the protruding portion is coupled to the recessed portion.

13. The laser processing apparatus of claim 10, further comprising a power supply unit, wherein the power supply unit is electrically connected to the second terminal part.

14. The laser processing apparatus of claim 13, wherein:
the power supply unit comprises a plurality of power source units configured to provide power and a power switching unit electrically connected to each of the plurality of power source units; and
the power switching unit is configured to provide the second terminal part with power applied from any one among the plurality of power source units.

15. The laser processing apparatus of claim 1, further comprising a vacuum chamber, wherein:
the stage and the electrostatic chuck are disposed inside the vacuum chamber; and
the laser irradiation unit is disposed outside the vacuum chamber.

16. The laser processing apparatus of claim 15, wherein the vacuum chamber comprises:
a body comprising a ceiling surface, a floor surface, and a plurality of side surfaces connecting the ceiling surface and the floor surface; and
a chamber window disposed in the ceiling surface,
wherein the chamber window overlaps the laser irradiation unit in a plan view and transmits the laser beam.

17. A laser processing apparatus comprising:
a stage configured to transfer a target substrate;
an electrostatic chuck divided into a first region in contact with the stage and a second region in contact with the target substrate;
a laser irradiation unit disposed above the stage and spaced apart from the stage and configured to irradiate a laser beam on the target substrate; and
a power supply unit, wherein:
the electrostatic chuck comprises a first terminal part disposed in the first region and a plurality of holes disposed in the second region;
the stage comprises an opening overlapping the second region and a second terminal part overlapping the first terminal part; and
the power supply unit is electrically connected to the second terminal part.

18. The laser processing apparatus of claim 17, wherein the electrostatic chuck further comprises a spring connected to the first terminal part.

19. The laser processing apparatus of claim 17, wherein:
the target substrate is divided into a plurality of etching regions to be etched by the laser beam and a non-etching region surrounding the etching regions;
the plurality of holes of the electrostatic chuck overlap the plurality of etching regions of the target substrate; and
planar areas of the plurality of holes of the electrostatic chuck are greater than planar areas of the plurality of etching regions of the target substrate.

20. The laser processing apparatus of claim 17, wherein the plurality of holes of the electrostatic chuck have circular or slot shapes in a plan view.

* * * * *